United States Patent [19]
Hach

[11] 3,718,198
[45] Feb. 27, 1973

[54] WEIGHT LOSS SPRING BALANCE

[75] Inventor: Clifford C. Hach, Ames, Iowa

[73] Assignee: Hach Chemical Company, Ames, Iowa

[22] Filed: May 30, 1972

[21] Appl. No.: 257,925

[52] U.S. Cl. .............................................. 177/232
[51] Int. Cl. ............................................. G01g 3/02
[58] Field of Search ........................... 177/229–233

[56] References Cited

UNITED STATES PATENTS

| | | | |
|---|---|---|---|
| 273,720 | 3/1883 | George | 177/232 X |
| 2,649,299 | 8/1953 | Murphy, Jr. | 177/232 |
| 3,583,505 | 6/1971 | Valkinburgh et al. | 177/232 |

FOREIGN PATENTS OR APPLICATIONS

| | | | |
|---|---|---|---|
| 365,837 | 12/1922 | Germany | 177/232 |
| 2,186 | 9/1863 | Great Britain | 177/233 |
| 643,830 | 9/1950 | Great Britain | 177/233 |
| 751,137 | 8/1933 | France | 177/233 |

*Primary Examiner*—George H. Miller, Jr.
*Attorney*—C. Frederick Leydig et al.

[57] ABSTRACT

A spring balance in which a coil spring is suspended in a transparent cylindrical tube between a cap assembly, to which the spring is adjustably attached for calibration, and a strand slidably fitted in a bottom guide plug on the tube. The strand carries a hook to hold an object to be weighed, and the cap is suspended by a telescoping rod removably fitted in a weighted base. A scale plate is slidably secured on the outside of the tube, and a reference mark and vernier scale is formed on a cylindrical block which slides loosely in the tube at the bottom of the spring.

4 Claims, 3 Drawing Figures

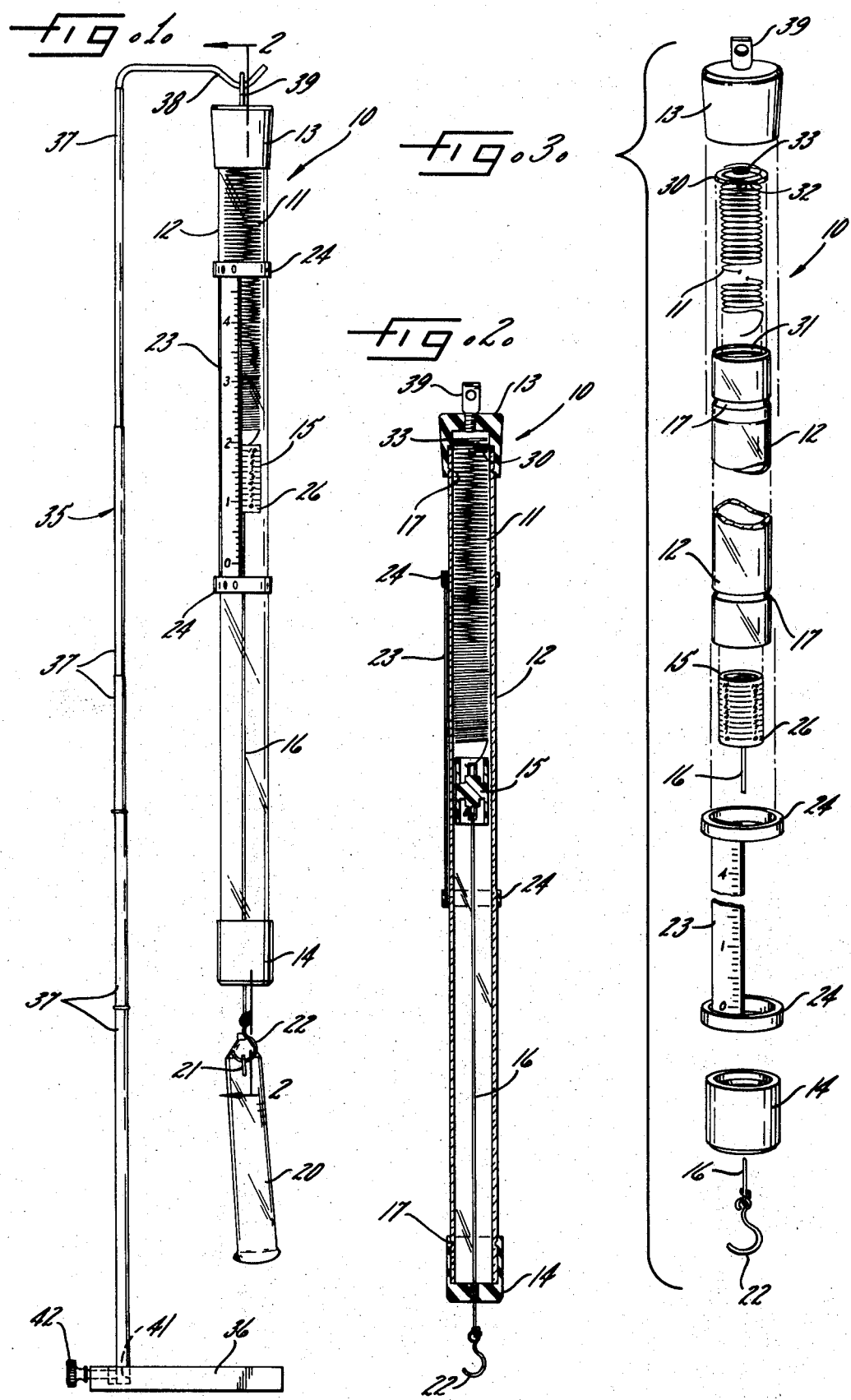

WEIGHT LOSS SPRING BALANCE

This invention relates generally to analytical balances and more particularly concerns a spring balance for measuring small weight differences.

The primary aim of the invention is to provide an accurate spring balance suited for inclusion in a portable chemical testing kit and, to that end, to provide a balance of this kind which is extremely rugged and capable of being compactly stored.

Another object is to provide a balance as characterized above that is quite simply set up and easy to use with full accuracy.

A further object is to provide a balance of the above type which is very economical to manufacture, and this factor of low cost combined with exceptional resistance to damage, makes the balance well suited for school and similar educational uses.

Other objects and advantages of the invention will become apparent upon reading the following detailed description and upon reference to the drawings, in which:

FIG. 1 is an elevation of a balance embodying the invention;

FIG. 2 is a section taken approximately along the line 2—2 in FIG. 1; and

FIG. 3 is an exploded fragmentary perspective showing elements of the balance appearing in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a balance 10 embodying the invention and having, as the weight responsive element, a long coil spring 11 formed of many coils of fine wire encased in an elongated transparent tube 12. The tube 12 is closed at its ends by a cover cap 13 and a guide plug 14, both recessed to receive the respective ends of the tube. The lower end of the spring 11 is looped through an aperture in a block 15 loosely fitted in the tube 12, and an elongated strand 16 is secured to the block 15 and slidably fitted in the plug 14 for movement axially of the tube. In the illustrated construction, the cap 13 and plug 14 are snap-locked on the tube 12 by being formed with interfitting projections and grooves 17.

The illustrated balance is intended to measure weight losses on the order of hundredths of a gram in small liquid reagent dispensers such as the dispenser 20 having a pierced flange 21. Preferably therefore, a hook 22 is secured to the end of the strand 16 to easily and conveniently removably support the dispenser 20 on the spring by slipping the hook through the hole in the pierced flange 21.

To provide a visual indication of spring deflection, a scale marked plate 23 is mounted on a pair of rings 24 surrounding the tube 12. Preferably, the plate is slightly bent prior to slipping the plate and ring assembly onto the tube 12 so that the plate 23 and the rings 24 frictionally engage the tube and hold their position when slidably adjusted along the tube length. In this way, the zero or starting position for a given dispenser can be easily established by sliding the scale plate 23 axially along the tube. Since the exemplary balance is intended to measure weight loss, the scale in the plate 23 runs from a bottom zero mark upwardly through the balance weight range. Cooperating with the plate scale is a reference mark 26 on the block 15. Preferably, the block 15 is cylindrical and the reference mark 26 is circular, running around the block so that there is no registration problem between the mark and the scale plate 23. The illustrated embodiment also includes a vernier scale on the block 15 of which the reference mark 26 is a part.

For adjusting the free hanging length of the spring 11, and thus the overall spring rate, an anchor plate 30 is fixed between the cover cap 13 and the tube 12, and the upper end of the spring is releasably fitted over the top of the plate. In the preferred embodiment, the plate 30 is received in a circular ledge 31 formed in the top of the tube, and the cap 13 has an internal shoulder which overlies the top of the tube 12 and the periphery of the plate 30 (see FIG. 2).

The circular outline of the anchor plate 30 is interrupted at 32 so as to provide space for the wire of the spring 11 to extend above the plate, and a set screw 33 is threaded into the plate 30 to clamp the wire of the spring to the plate. By loosening the screw 33 and rotating the spring 11, more or less spring wire can be put into the free hanging length of the spring. In this way, the balance can be calibrated so that the scale on the plate 23 directly indicates the desired weight units.

As a feature of the invention, the tube 12 is suspended on a telescoping rod 35 removably secured to a weighted base 36. The rod 35 is made of interfitted telescoping sections 37, so as to permit collapsing into a total short length, with the uppermost section being bent into a hook 38 for engaging the eyelet of a pin 39 threaded into the cover cap 13. The base 36 is formed with a seat 41 for receiving the lower end of the rod 35, and a thumb screw 42 is threaded in the base so as to engage the rod and lock it in place.

By forming the tube 12 of a clear high impact plastic, it can be seen that a balance is obtained which is extremely resistant to inadvertent damage. The parts are extremely light in weight and, because of the take-apart collapsible nature of the construction, the unit is therefore well suited for inclusion in portable kits utilizing a balance for measuring the amounts of reagent used in a test procedure.

I claim as my invention:

1. A balance comprising, in combination, an elongated transparent tube, a cover cap fitted on one end of said tube, means for engaging said cap and suspending said tube, a guide plug fitted on the other end of said tube, an elongated strand slidably fitted in said plug for movement axially of said tube, said strand having an extending end adapted to hold an object to be weighed, a coil spring extended in said tube between said strand and said cap, a scale marked plate slidably secured for axial movement on the outside of said tube, and a block loosely fitted in said tube and secured to said wire adjacent the end of said spring, said block having a reference mark thereon adapted to move along said scale plate as said spring deflects under load.

2. The combination of claim 1 in which said tube is cylindrical and said block is a cylinder adapted to ride loosely within the tube, said cylinder carrying both said reference mark and a vernier scale for use with said scale marked plate.

3. The combination of claim 1 in which said means includes a weighted base and a telescoping rod removably secured to the base and having a hook portion for engaging said cap.

4. The combination of claim 1 including an anchor plate fixed between said tube and said cap, said coil spring having one end portion releasably fitted over said anchor plate so that, by changing the length of said end portion, the free hanging length of the spring can be varied.

* * * * *